(12) United States Patent
Jalloul

(10) Patent No.: US 6,324,403 B1
(45) Date of Patent: Nov. 27, 2001

(54) DYNAMIC REDUCTION OF TELEPHONE CALL CONGESTION

(75) Inventor: Amer Jalloul, Haltom, TX (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/186,335

(22) Filed: Nov. 5, 1998

(51) Int. Cl.[7] .............. H04Q 7/20; H04B 7/00; H04B 1/00
(52) U.S. Cl. .............. 455/453; 455/522; 455/70
(58) Field of Search .............. 455/69, 67.6, 522, 455/453, 450, 452, 422, 437, 439, 70; 370/318, 328

(56) References Cited

U.S. PATENT DOCUMENTS

| | | | | |
|---|---|---|---|---|
| 4,435,840 | * | 3/1984 | Kojima et al. | 455/524 |
| 4,613,990 | * | 9/1986 | Halpern | 455/522 |
| 4,669,107 | * | 5/1987 | Eriksson-Lennartsson | 455/453 |
| 5,241,685 | * | 8/1993 | Bodin et al. | 455/453 |
| 5,245,629 | * | 9/1993 | Hall | 375/200 |
| 5,276,907 | * | 1/1994 | Meidan | 455/436 |
| 5,303,268 | * | 4/1994 | Tsutsumi et al. | 375/296 |
| 5,333,175 | * | 7/1994 | Ariyavisitakul et al. | 455/423 |
| 5,379,448 | * | 1/1995 | Ames et al. | 455/524 |
| 5,442,807 | * | 8/1995 | Takayama | 455/453 |
| 5,455,963 | * | 10/1995 | Shiotsuki et al. | 455/439 |
| 5,475,861 | * | 12/1995 | Hall | 455/422 |
| 5,499,395 | * | 3/1996 | Doi et al. | 455/33.1 |
| 5,504,938 | * | 4/1996 | Redden | 455/436 |
| 5,579,373 | * | 11/1996 | Jang | 455/436 |
| 5,666,356 | * | 9/1997 | Fleming et al. | 370/328 |
| 5,697,054 | * | 12/1997 | Andersson | 455/524 |
| 5,749,055 | * | 5/1998 | Dahlin | 455/553 |
| 5,754,959 | * | 5/1998 | Ueno et al. | 455/453 |
| 5,822,693 | * | 10/1998 | Harrison | 455/432 |
| 5,896,573 | * | 4/1999 | Yang et al. | 455/453 |
| 5,898,682 | * | 4/1999 | Kanai | 370/331 |
| 5,930,684 | * | 7/1999 | Keskitalo et al. | 455/69 |
| 5,966,649 | * | 10/1999 | Gulliford et al. | 455/408 |
| 6,137,187 | * | 1/2001 | Salonaho et al. | 455/453 |

\* cited by examiner

*Primary Examiner*—Nguyen T. Vo
*Assistant Examiner*—Charles N. Appiah

(57) ABSTRACT

A method, apparatus, article of manufacture, and propagated signal, for setting up a call by receiving a value representing a power level for a cell, adjusting the value representing the power level for the cell based on congestion to produce an adjusted value, and setting up the call based on the adjusted value.

46 Claims, 6 Drawing Sheets

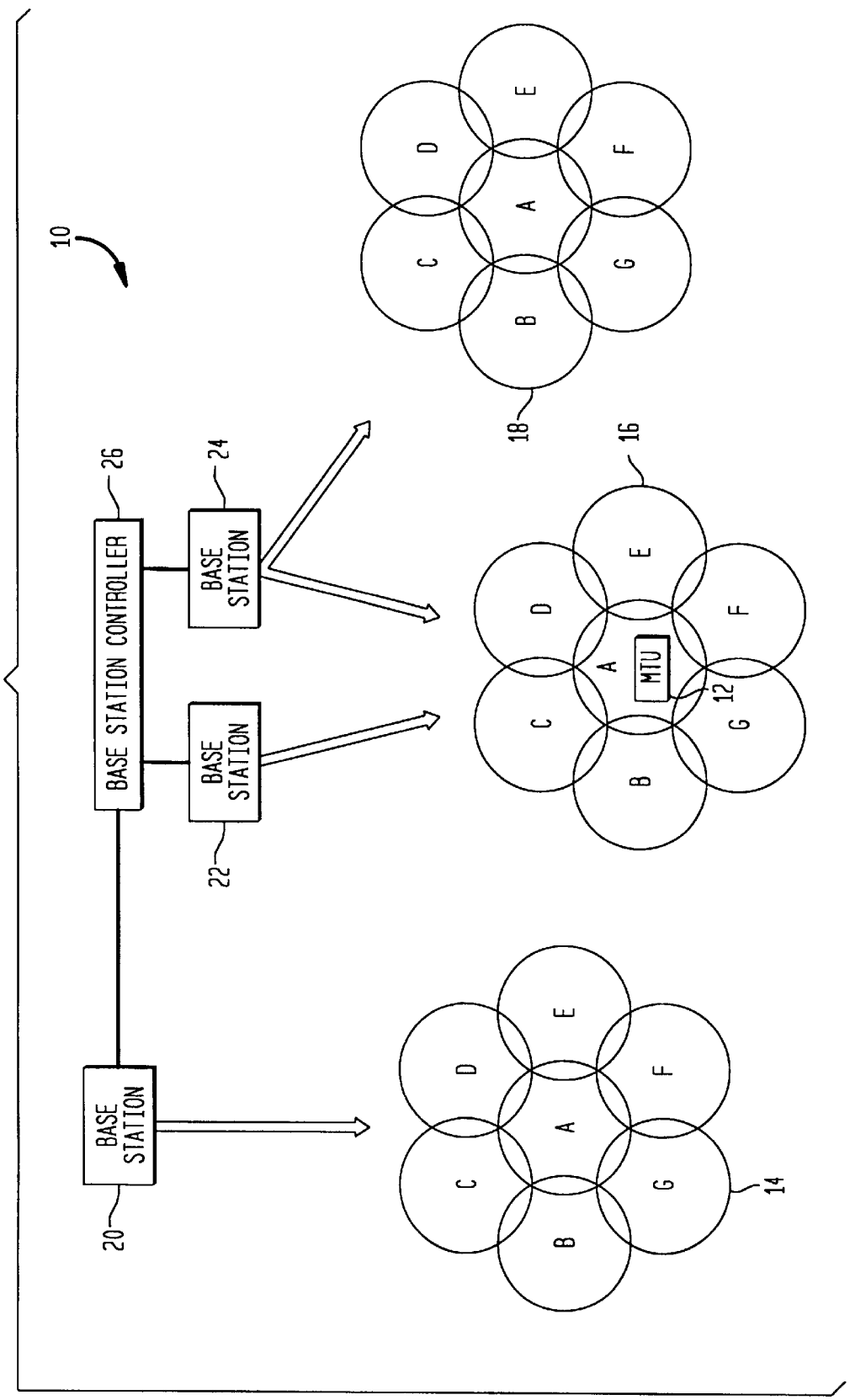

US 6,324,403 B1

DYNAMIC REDUCTION OF TELEPHONE CALL CONGESTION

BACKGROUND OF THE INVENTION

1. Field of the Invention

The present invention relates the dynamic reduction of telephone call congestion, and more particularly, to the dynamic reduction of telephone call congestion in a mobile telephone system.

2. Description of the Related Art

In a mobile telephone communication system, such as the global system for mobiles (GSM) telephone communication system, "call setup" occurs over common control channels. As illustrated in the mobile telephone communication system 10 of FIG. 1, a mobile telephone unit 12 is located in one of cell clusters 14, 16, and 18, each of which includes cells A–G. The mobile telephone unit 12 measures the power level of a number of base stations 20, 22, and 24 in the general vicinity, and reports the power level measurements to a base station controller 26 via the respective base stations 20, 22, 24. The base station controller 26 then sets up or assigns a call requested by the mobile terminal unit 12 on the strongest base station 20, 22, 24. The base station controller 26 makes the decision for the mobile terminal unit 12 and sends an order to the strongest serving base station 20, 22, 24 (as reported by the mobile terminal unit 12) to set up the desired call.

Congestion occurs when too many mobile terminal units are trying to set up calls on a particular cell, (in this case, cell A in cell cluster 16) which requires additional channel capacity above its existing configuration.

The cluster of cells 16 provides service to the mobile terminal units 12 within their coverage area. In some cases, mobile users may gather with much higher density around one cell in a cluster 16, causing a much higher blocking probability for that cell, than is present in the neighboring cells.

In a particular example, cell A of cell cluster 16 includes an area in which an event, such as a sporting event, is taking place and cell A experiencing congestion levels in excess of a threshold, for example 10% of the calls are not being assigned, whereas the congestion of all other cells B–G in cluster 16 is much less than 10%, for example less than 1%. This congestion prevents some of the mobile telephone units within cell A of cluster 16 from having their calls assigned. As a result, many subscribers are unable to complete their desired calls.

SUMMARY OF THE INVENTION

The present invention solves this problem by providing a method, apparatus, article of manufacture, and propagated signal which adjusts the value representing the power level for the strongest base station, when the congestion of the strongest server is above a threshold level. Once the level of the strongest server is adjusted, the order of the base stations is then rearranged, and another cell becomes the strongest serving cell at the location where the mobile terminal unit is located, thereby effectively reducing the set up radius of the strongest base station. This reduction impacts the number of subscribers to be served by that cell, and hence, results in a congestion reduction in that cell.

BRIEF DESCRIPTION OF THE DRAWINGS

FIG. 1 illustrates several clusters of cells within a network controlled by a single base station controller;

DETAILED DESCRIPTION OF THE INVENTION

Figure 2A:
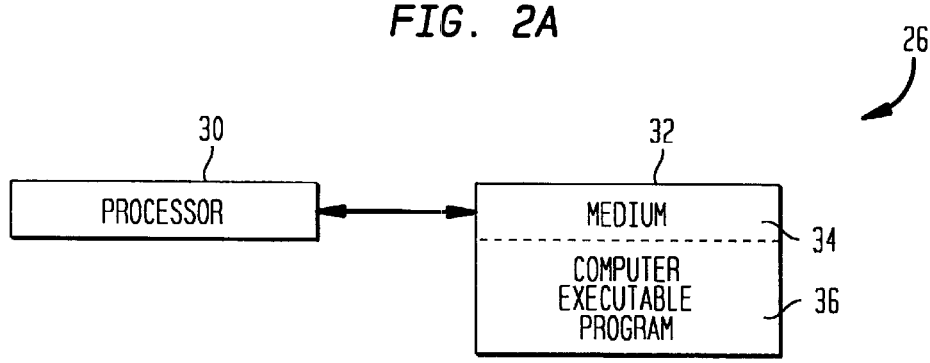
FIGS. 2a and 2b illustrate the base station controller in preferred embodiments of the present invention.

FIG. 1 illustrates several clusters of cells within a network controlled by base station controller 26. Each cell 12A–G, 14A–G, 16A–G provides service to mobile terminals within their coverage area. In some cases, mobile users may gather with a much higher density around one of the cells in a cluster, causing a much higher blocking probability for that cell than its neighbors.

For example, assume that cell A is experiencing congestion levels in excess of a threshold value (such as 10%), whereas the congestion level in all other cells in that cluster is much less than 10% (such as <1%).

As set forth above, congestion occurs when too many mobile terminals are trying to set up calls on a particular cell (in this case, cell A of cluster 16), which requires additional channel capacity above its existing configuration.

Call setup in GSM occurs over common control channels, where the mobile terminal unit 12 measures the power level of a number of bases stations 20, 22, 24 in the general vicinity, and reports these measurements to the base station controller (BSC) 26. The call is then set up on the strongest server. The BSC 26 makes the decision for the mobile terminal unit 12 and sends an order to the strongest serving base station (as reported by the mobile terminal unit 12) to set up a call.

Figure 2B:
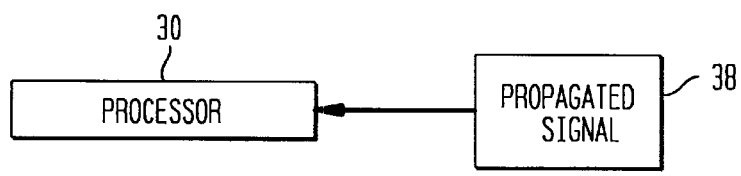

As illustrated in FIG. 2a, the BSC 26 includes at least a processor 30 and an article of manufacture 32. The article of manufacture 32 further includes a storage medium 34 and an executable computer program 36. The executable computer program 36 includes the instructions to dynamically reduce the call congestion. In another embodiment, as illustrated in FIG. 2b, the executable computer program 36 is provided as part of an externally supplied propagated signal 38.

Figure 3:
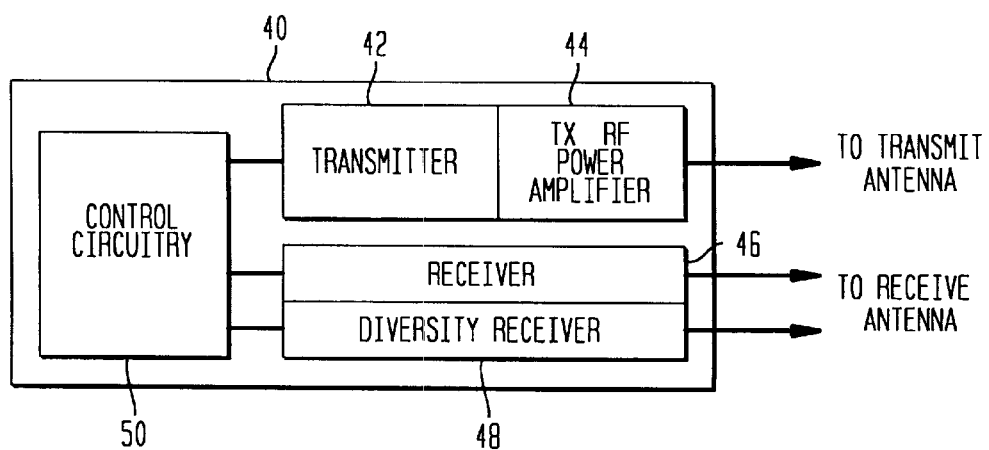
FIG. 3 illustrates other elements of the base station controller in another preferred embodiment of the present invention.

As illustrated in FIG. 3, the base station 26 also includes a radio transceiver 40. The radio transceiver 40 is an electronic unit inside the base station 26 that contains a transmitter and receiver. In one embodiment, the radio transceiver 40 includes a transmitter 42, a transmit RF power amplifier 44, a receiver 46, a diversity receiver 48, and control circuitry 50. The output of the transmit RF power amplifier 44 is supplied to a transmit antenna (not shown) and the outputs of the receiver 46 and diversity receiver 48 are provided to receive antennas (also not shown).

The present invention includes a modification to the executable computer program 36 in the BSC 26 so that, upon congestion of a cell A above some threshold level, an adjustment is applied to the level of the strongest server. Once the level of the strongest server is reduced, the order of the servers is then re-arranged, and another cell becomes the strongest serving cell at the location where the mobile is located. Thus, effectively, the setup radius of the original strongest server has been reduced. This reduction will impact the number of subscribers to be served by that cell, and hence, result in a reduction in congestion.

Figure 4:
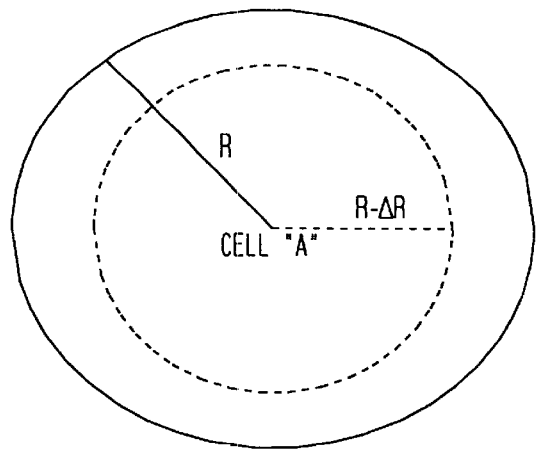
FIG. 4 illustrates an adjustment to the call setup radius of cell A.

In a preferred embodiment, the adjustment $\Delta R$ is the result of a constant decrease of "$-z$dB" in received signal levels, as measured by the mobile terminal unit 12. This produces a reduction in the setup radius of the original strongest server, as illustrated in FIG. 4. However, the adjustment "$-z$dB" need not be a fixed dB reduction. In fact, the adjustment could be a different type of fixed adjustment or an adjustment which varies in some manner, such as, over time.

In order to prevent the system from oscillating, i.e. activation and deactivation as the congestion level goes up and down, two thresholds are defined, a lower value and an upper value. The reduction is activated in the BSC 26 when congestion of one of it's cells is above some level, i.e., 20%, and not deactivated until congestion is reduced below another level, i.e., 5%. This prevents any oscillatory behavior.

The effect of reduction of the call setup radius can be seen from the reduction in the path loss. The GSM standard recommends the use of Hata Model for propagation calculations. The model can be simply stated as one which predicts the path loss L in dB as $$L = La + Lb * \text{Log}(R) \quad (1)$$

The term La is a function of the urbanization level, base station antenna height, mobile terminal unit antenna height, and the RF frequency. Hence, the term La varies for each of the urban classes; urban, suburban, quasi-rural, and rural. The term Lb is given by $$Lb = 44.9 - 6.55 * \text{Log}(hB) \quad (2)$$

where hB is the GSM antenna height above ground in meters. A differential form of the loss path yields $$\Delta R/R = \Delta L/Lb \quad (3)$$

Using terms $z = \Delta L$, and $44.9 - 6.55 * \text{Log}10(hB)$ for Lb:

$$\Delta R/R = \frac{z(\text{dB})}{44.9 - 6.55 * \text{Log}(hB)} \quad (4)$$

Assuming the traffic is evenly distributed within the congested cell, the percentage reduction in the number of subscribers trying to set up calls on cell A becomes $$\Delta \lambda / \lambda = 2 * \Delta R/R = \frac{2 * z}{44.9 - 6.55 * \text{Log}(hB)} \quad (5)$$

Figure 5:
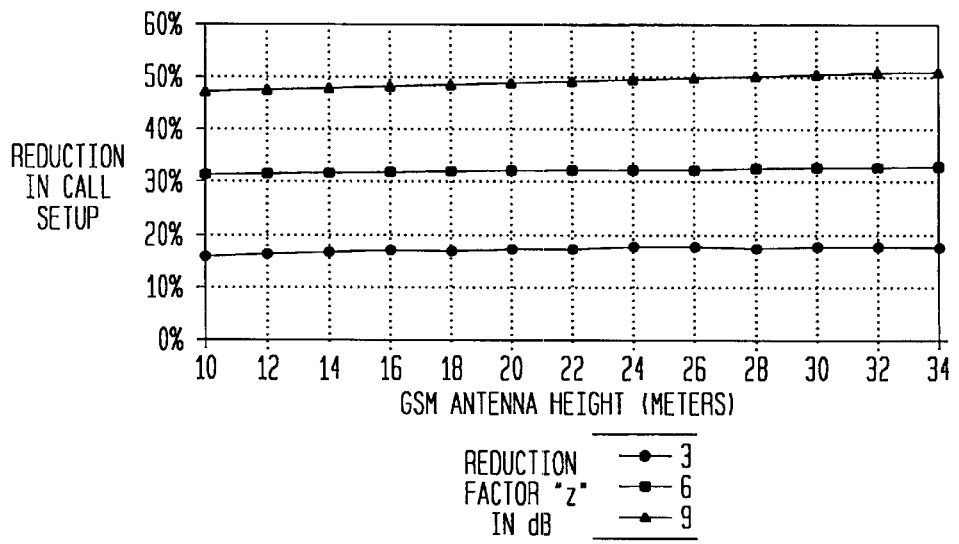
FIG. 5 illustrates the percentage reduction in the number of subscribers trying to set up calls as a function of reduction factor.

A plot of equation (5) is shown in FIG. 5.

In order to estimate the reduction in blocking probability due to call setup radius reduction, assume that call setup traffic is modeled by the Erlang B model, where the probability of blocking is $$P(\lambda) = \frac{[(\lambda T/60)^N]N!}{\Sigma [\lambda T/60^X]/x!} \quad (6)$$
$$x = 0, N$$

where $\lambda$ is the rate of calls in the Busy Hour, T is the average call duration in minutes, and N is the total number of available channels.

Figure 6:
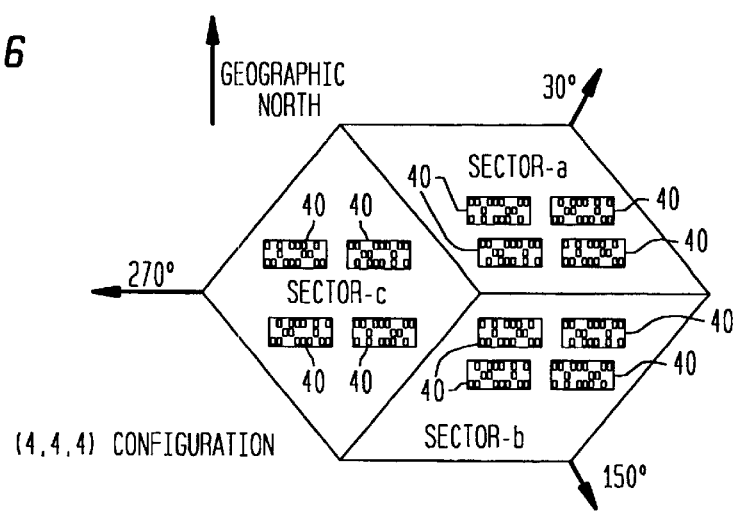
FIG. 6 illustrates an exemplary site configuration for which telephone call congestion is dynamically reduced in one embodiment of the present invention.

FIG. 6 illustrates an exemplary site configuration for which telephone call congestion is dynamically reduced in one embodiment of the present invention. The site configuration illustrated in FIG. 6 includes three sectors, a, b, and c which point in directions of 30°, 150°, and 270°, respectively, relative to geographic north. As illustrated in FIG. 6, each of sectors a, b, and c includes four radio transceivers 40. As a result, the site configuration illustrated in FIG. 6 is denoted as a (4, 4, 4) configuration. Similarly, a (2, 2, 2) site configuration would have only two radio transceivers 40 in each of sectors a–c.

Figure 7:
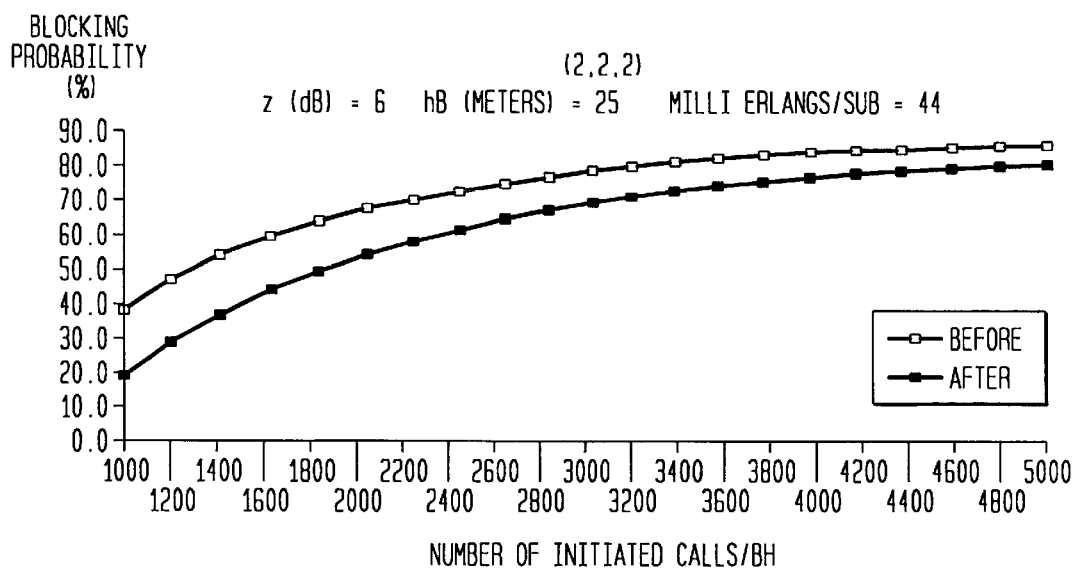
FIGS. 7–10 illustrate the reduction in blocking for various site configurations.
Figure 8:
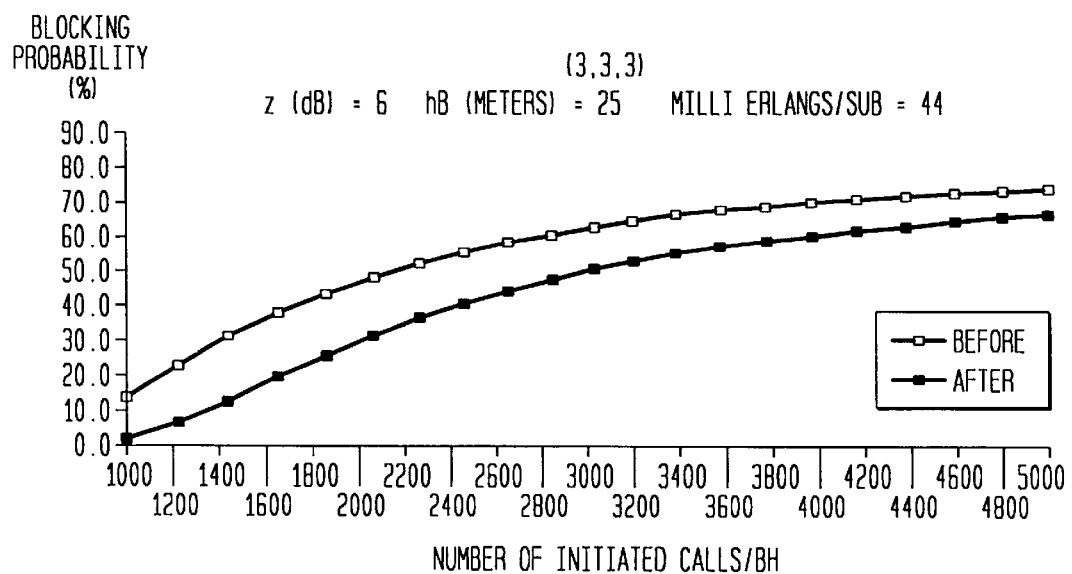
Figure 9:
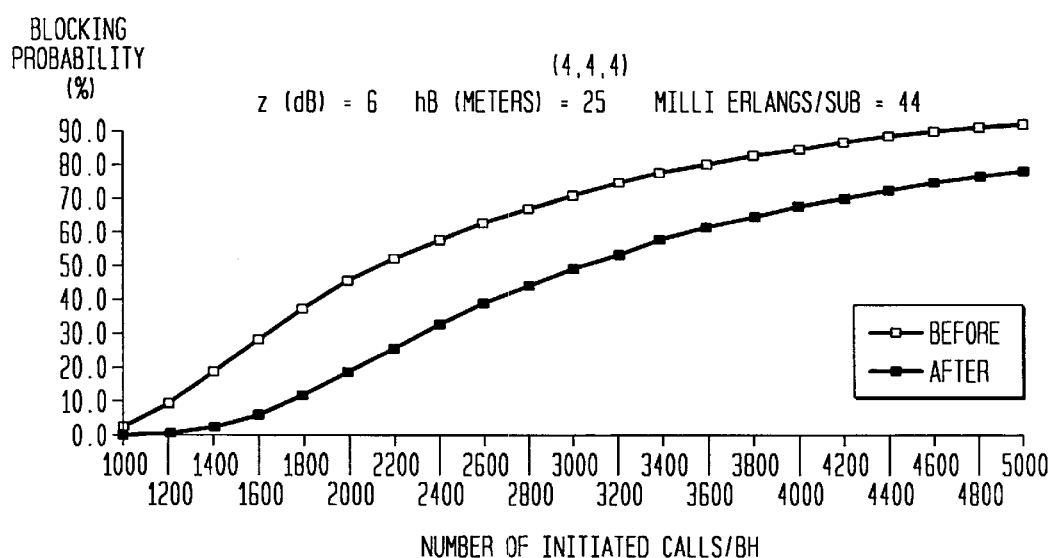
Figure 10:
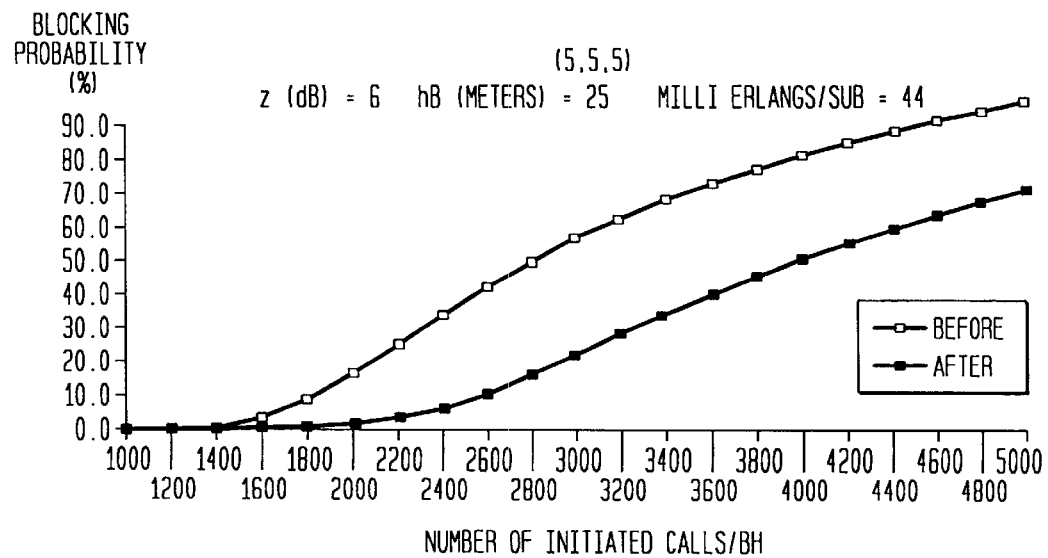

FIGS. 7 and 8 illustrate the reduction in blocking for various site configurations as a function of the total number of initiated calls in the busy hour, with 44 Milli-Erlangs/subscriber, and FIGS. 9 and 10 illustrate the same curves with 22 Milli-Erlangs/subscriber. Milli-Erlangs/subscriber is a unit of traffic usage. In particular, one Erlang is one call that lasts sixty minutes, two calls that last for thirty minutes each, or three calls that last for twenty minutes, etc. If the duration of a call is T minutes, then the Erlangs, E, is determined by:

$$E = T/60. \quad (7)$$

For example, 44 Milli-Erlangs/subscriber is equal to 0.044 Erlangs per subscriber, and therefore, E equals 0.044. Using equation (7), one can solve for the duration of a call T, where T equals E×60 or (0.044)×60 =2.64 minutes.

The plots indicate that congestion reduction at cell A (which is the congested site) is greater for higher configurations ((4, 4, 4) and higher) sites than for lower configuration sites ((2, 2, 2) and less), and is more effective when the Milli-Erlangs/subscriber is lower.

Figure 11:
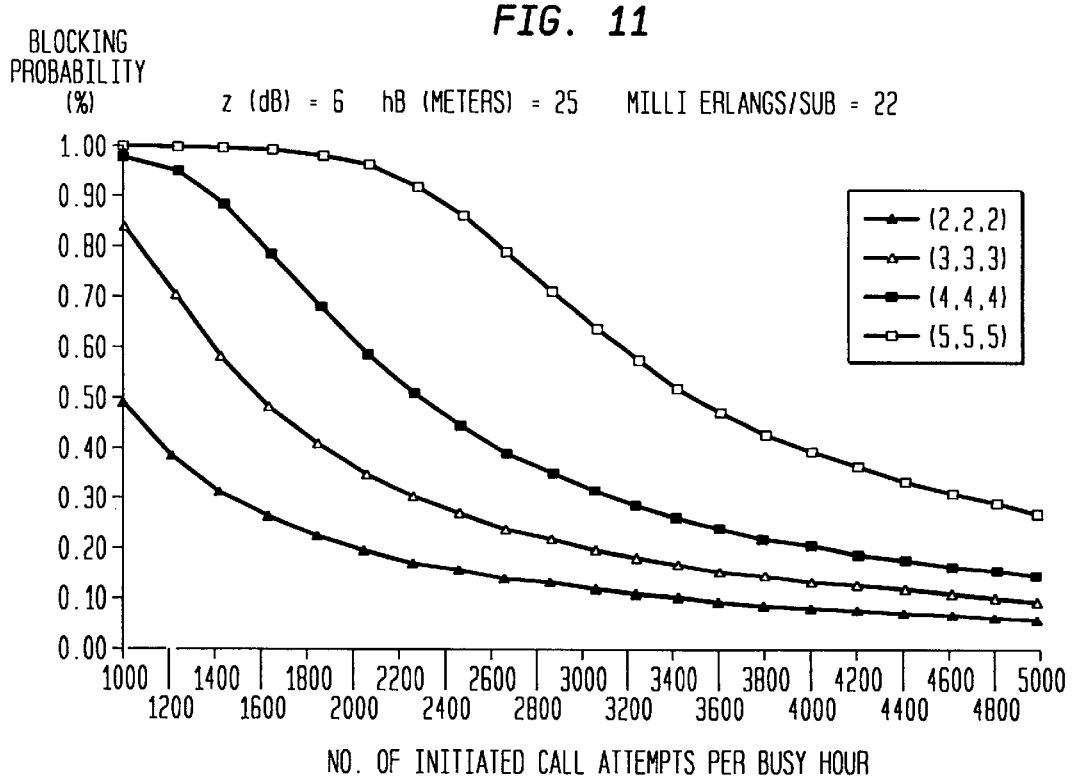
FIGS. 11–12 illustrate the congestion reduction factor as a function of a number of initiated call attempts per busy hour for two different sites.
Figure 12:
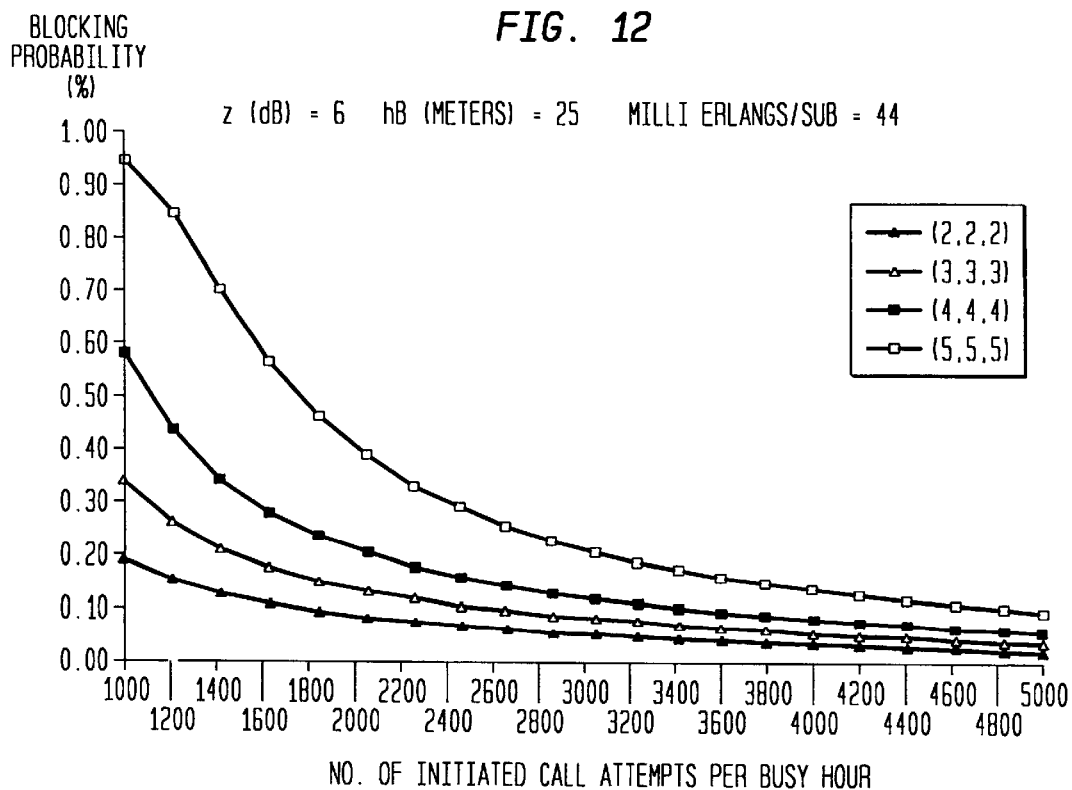

The congestion reduction factor is plotted in FIGS. 11 and 12. These figures show that the present invention is more effective in high configuration sites, and in areas where the subscriber behavior exhibits small channel holding times. As an example, consider a cell configured as a (5,5,5) site, with a traffic load from subscribers within its service area such that the total number of call attempts in the busy hour is 2600 calls. Using FIG. 11, the congestion at that cell is reduced by 80%. Further, the reduction factor is 26% for 44 the Milli-Erlang/subscriber case, as shown in FIG. 12.

As described above, the present invention reduces congestion on a congested cell within a cluster of un-congested cells, or much less congested cells.

This technique can be activated only when congestion levels in a cell reaches an upper threshold level, and will not be deactivated unless the congestion has been reduced to a lower threshold. Having two thresholds prevents a state of oscillation of the feature, i.e. activation then deactivation.

Although the above-identified preferred embodiment has been described in conjunction with a GSM system, the present invention is also applicable to other communication systems, such as North American TDMA systems or CDMA systems. Similarly, the preferred embodiment of the present invention has been described as taking place in a base station controller of the GSM system. However, the power level adjusting technique described above could also be performed in other elements of the GSM system, such as the base station. Similarly, in other architectures which include other elements, the power level adjusting technique of the present invention could also be performed in a mobile switching system (MSC), selection and distribution unit (SDU), or other applicable architectural element. Also although the preferred embodiment as described above, utilizes the congestion value as the parameter for determining call setup, other parameters may also be utilized, such as assignment rates, setup rates, and blocking rates.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of setting up a call, comprising the steps of:
   receiving a value representing a power level for a cell from a mobile telephone unit;
   adjusting the value representing the power level for the cell based on congestion to produce an adjusted value without adjusting an actual output power level; and
   setting up the call based on the adjusted value.

2. The method of claim 1, wherein the receiving and adjusting steps are performed for at least two cells and the setting up step sets the call up on the one of the at least two cells with the largest adjusted value.

3. The method of claim 2, wherein the adjusting step is performed only for cells of the at least two cells with a congestion value above a first threshold.

4. The method of claim 2, wherein two of the at least two cells are controlled by the same base station.

5. The method of claim 1, wherein the adjusting step adjusts a priority of the power level for the cell to reduce a number of calls being set up on the cell.

6. The method of claim 5, wherein the number of calls being set up on the congested cell is reduced by setting up calls on other surrounding less congested cells.

7. The method of claim 1, wherein the adjusting step includes applying a fixed adjustment factor to the power level for the cell.

8. The method of claimed 7, wherein the adjusting step includes subtracting a fixed value in dB from the power level for the cell.

9. The method of claim 8, further comprising the step of:
   once the cell has been corrected, adding the fixed amount in dB only after a congestion value of the cell is below a second threshold, lower than the first threshold.

10. The method of claim 8, wherein the first threshold and second threshold prevent oscillation.

11. The method of claim 1, wherein the call is a mobile telephone call.

12. The method of claim 1, wherein the method is performed by a base station controller.

13. A power level adjuster comprising:
   a receiver for receiving a value representing a power level for a cell from a mobile telephone unit; and
   a processor for adjusting the value representing the power level of the cell based on congestion to produce an adjusted value without adjusting an actual output power level;
   said power level adjuster setting up a call based on the adjusted value.

14. The power level adjuster of claim 13, wherein the receiving and adjusting steps are performed for at least two cells and the setting up step sets the call up on the one of the at least two cells with the largest adjusted value.

15. The power level adjuster of claim 14, wherein the processor adjusts the values only for cells of the at least two cells with a congestion value above a first threshold.

16. The power level adjuster of claim 14, wherein two of the at least two cells are controlled by the same base station.

17. The power level adjuster of claim 13, wherein the processor adjusts a priority of the power level for the cell to reduce a number of calls being set up on the cell.

18. The power level adjuster of claim 17, wherein the number of calls being set up on the congested cell is reduced by setting up calls on other surrounding less congested cells.

19. The power level adjuster of claim 13, wherein the processor performs the adjustment by applying a fixed adjustment factor to the power level for the cell.

20. The power level adjuster of claim 19, wherein the processor performs the adjustment by subtracting a fixed value in dB from the power level for the cell.

21. The power level adjuster of claim 20, wherein once the cell has been corrected, the processor adds the fixed amount in dB only after a congestion value of the cell is below a second threshold, lower than the first threshold.

22. The power level adjuster of claim 21, wherein the first threshold and the second threshold prevent oscillation.

23. The power level adjuster of claim 13, wherein the call is a mobile telephone call.

24. A computer program embodied on a computer-readable medium for setting up a call, comprising:
   a receiving source code segment for receiving a value representing a power level for a cell, wherein the value representing the power level is received from a mobile telephone unit;
   an adjusting source code segment for adjusting the value representing the power level for the cell based on congestion to produce an adjusted value without adjusting an actual output power level; and
   a set up source code segment for setting up the call based on the adjusted value.

25. The method of claim 24, wherein the receiving and adjusting steps are performed for at least two cells and the setting up step sets the call up on the one of the at least two cells with the largest adjusted value.

26. The computer program of claim 25, wherein the adjusting source code segment is performed only for cells of the at least two cells with a congestion value above a first threshold.

27. The computer program of claim 25, wherein two of the at least two cells are controlled by the same base station.

28. The computer program of claim 24, wherein the adjusting source code segment adjusts a priority of the power level for the cell to reduce a number of calls being set up on the cell.

29. The computer program of claim 28, wherein the number of calls being set up on the congested cell is reduced by setting up calls on other surrounding less congested cells.

30. The computer program of claim 24, wherein the adjusting source code segment includes applying a fixed adjustment factor to the power level for the cell.

31. The computer program of claim 30, wherein the adjusting source code segment includes subtracting a fixed value in dB from the power level for the cell.

32. The computer program of claim 31, wherein once the cell has been corrected, the adjusting source code segment adds the fixed amount in dB only after a congestion value of the cell is below a second threshold, lower than the first threshold.

33. The computer signal of claim 32, wherein the first threshold and the second threshold prevent oscillation.

34. The computer program of claim 24, wherein the call is a mobile telephone call.

35. A computer signal comprising:
- a receiving signal segment for receiving a value representing a power level for a cell, wherein the value representing the power level is received from a an mobile telephone unit;
- an adjusting signal segment for adjusting the value representing the power level for the cell based on congestion to produce an adjusted value without adjusting an actual output power level; and
- a set up signal segment for setting up a call based on the adjusted value.

36. The method of claim 35, wherein the receiving and adjusting steps are performed for at least two cells and the setting up step sets the call up on the one of the at least two cells with the largest adjusted value.

37. The computer signal of claim 36, wherein the adjusting signal segment is performed only for cells of the at least two cells with a congestion value above a first threshold.

38. The computer signal of claim 36, wherein two of the at least two cells are controlled by the same base station.

39. The computer signal of claim 35, wherein the adjusting signal segment adjusts a priority of the power level for the cell to reduce a number of calls being set up on the cell.

40. The computer signal of claim 39, wherein the number of calls being set up on the congested cell is reduced by setting up calls on other surrounding less congested cells.

41. The computer signal of claim 35, wherein the adjusting signal segment includes applying a fixed adjustment factor to the power level for the cell.

42. The computer signal of claim 41, wherein the adjusting signal segment includes subtracting a fixed value in dB from the power level for the cell.

43. The computer signal of claim 42, wherein once a cell has been corrected, the adjusting signal segment adds the fixed amount in dB only-after a congestion value of the cell is below a second threshold, lower than the first threshold.

44. The computer signal of claim 43, wherein the first threshold and the second threshold prevent oscillation.

45. The computer signal of claim 35, wherein the call is a mobile telephone call.

46. The computer signal of claim 35, wherein the computer signal is embodied on a carrier-wave.

* * * * *